Jan. 17, 1950  A. P. ROTH  2,495,136
AUTOMOBILE TRAILER HITCH
Filed May 13, 1947  3 Sheets-Sheet 1
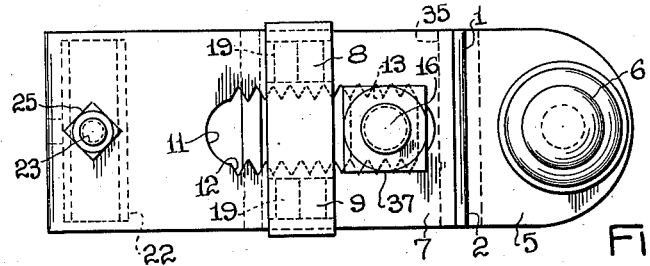
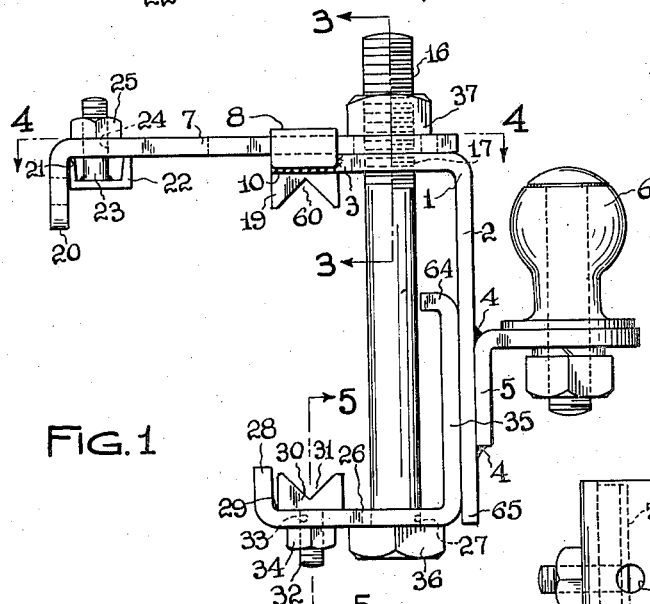
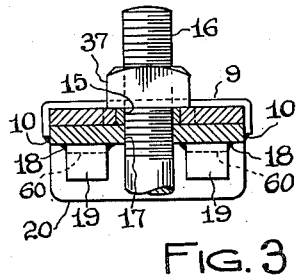
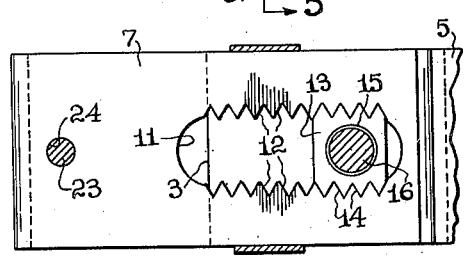
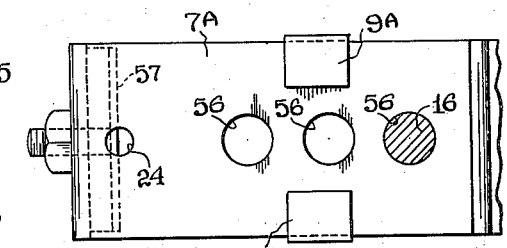
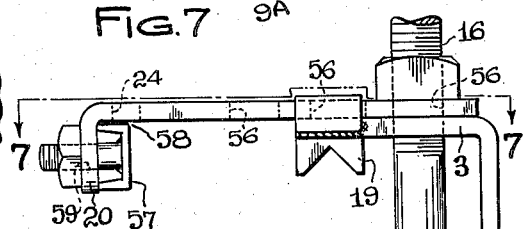
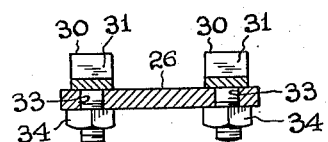
INVENTOR.
ARNOLD P. ROTH
BY
Harry P. Canfield
ATTORNEY

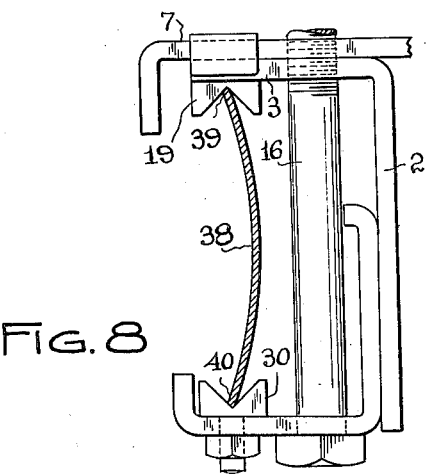
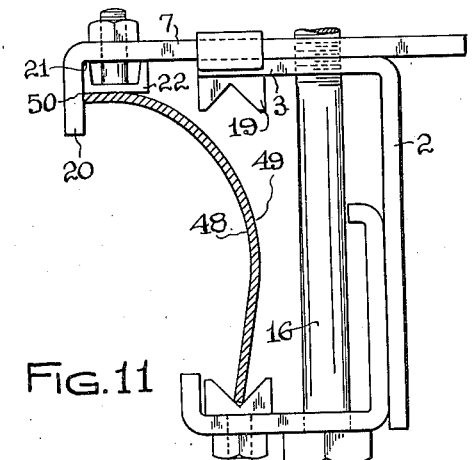
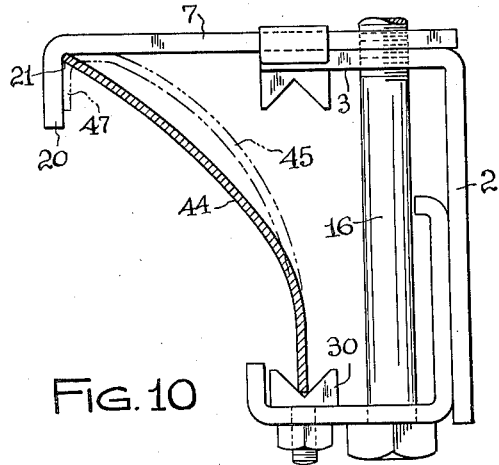
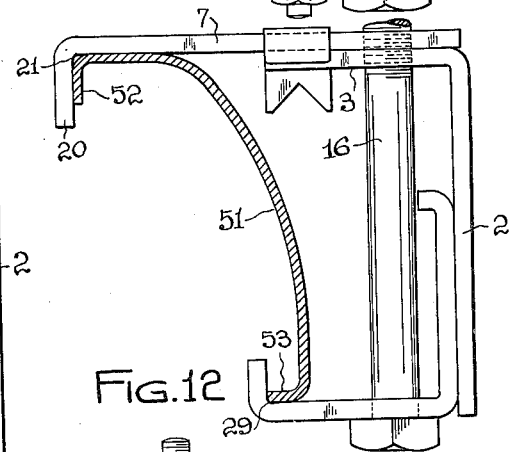
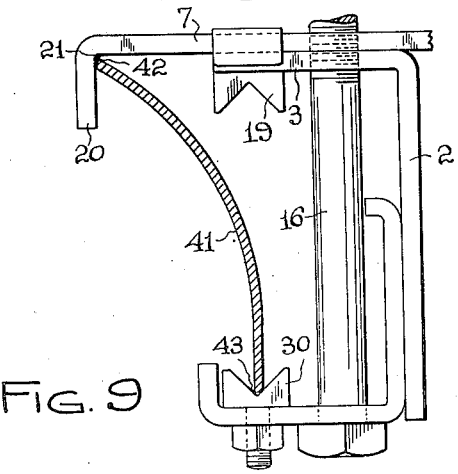
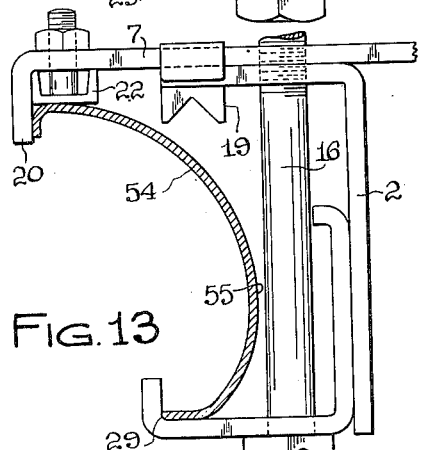

Patented Jan. 17, 1950

2,495,136

UNITED STATES PATENT OFFICE 2,495,136

AUTOMOBILE TRAILER HITCH

Arnold P. Roth, Wickliffe, Ohio

Application May 13, 1947, Serial No. 747,641

4 Claims. (Cl. 280—33.44)

This invention relates to hitch devices for hitching or attaching a trailer vehicle to an automobile to be propelled thereby.

Such devices in general are known. A well known type comprises a rearward part on the forward frame of the trailer vehicle; and a forward part constructed to be attached to the rear bumper of the automobile; and a universal joint between them of the ball and socket class.

The forward part, attached to the automobile bumper, usually comprises the ball of the joint, and may be left permanently attached to the bumper after once being installed, and in use the trailer part of the device is mounted on or demounted from the ball to attach and detach the trailer.

The present invention relates to hitch devices of this general type.

For a number of years, the automobile bumper was designed to be purely functional and comprised simply a strip of steel sometimes concavo-convex in cross section, with the upper edge directly above the lower edge; and the forward part of prior hitch devices of the type referred to comprised a simple clamp operable to grip these edges to mount it on the automobile.

However in recent years the evolution of ornamental contours, in the design of automobiles, has been extended to include the bumpers so that in many makes of automobiles the bumper does not have such an upper and lower edge, to receive such a clamp.

Automobile bumpers in general are made from sheet metal. In some cases, the top and bottom portions are in the form of thin edges of the metal. In other cases, the edge is turned inwardly out of sight either at the top or at the bottom or both. In some cases, the bumper lies in substantially a vertical plane; in other cases, it is upwardly rearwardly inclined and convex forwardly. There is thus a great range of sizes and variety of shapes.

A problem therefore has arisen to construct the part of the trailer hitch which attaches to the bumper so that it is adaptable to grip the bumper to attach it thereto, no matter what the contour or cross sectional form of the bumper may be, among the various makes and year models and ornamental designs of automobiles.

It is the object of the present invention to solve this problem by a single construction of hitch device.

The device of the present invention comprises among other features an upper and a lower jaw element with means to draw them together to grip and clamp the bumper between them; and one of the jaw elements, preferably the upper one, is made horizontally adjustable to reach back and grip the top of the bumper when, in form, it is upwardly rearwardly inclined; and the gripping parts of the jaw elements are formed so as to engage and grip the top and bottom of the bumper with equal effectiveness, whether both or either of them is a thin metal edge, or a bent over rounded edge.

And the invention comprises other features which render it simple to construct and assemble and cheap to produce and easy to mount on the bumper and effective in operation.

The invention is fully disclosed in the following description, taken in connection with the accompanying drawing, in which:

Fig. 1 is a side elevational view, and Fig. 2 is a top plan view of an embodiment of the invention;

Fig. 3 is a fragmentary sectional view from the plane 3—3 of Fig. 1;

Fig. 4 is a sectional view from the plane 4—4 of Fig. 1;

Fig. 5 is a sectional view from the plane 5—5 of Fig. 1, with parts behind the section plane omitted;

Fig. 6 is a fragmentary view similar to a part of Fig. 1, and Fig. 7 is a fragmentary view similar to a part of Fig. 2 illustrating a modification which may be utilized;

Figs. 8 to 13 are diagrammatic views generally similar to Fig. 1 and illustrating the manner in which the invention is applicable to be attached to various forms of automobile bumper;

Figure 14:
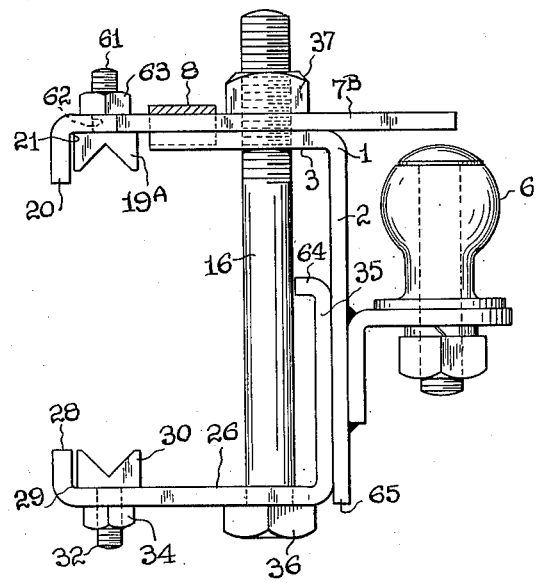
Fig. 14 is a view similar to Fig. 1 illustrating a modification.

Referring to the drawing, Figs. 1 to 5, there is shown at 1 a frame element, which, in the position of use illustrated, comprises a vertical leg 2, and an upper horizontal leg 3; and which is preferably made by cutting off a length of flat steel bar and bending it.

On the forward face of the bar is welded (as at 4) a bracket 5, on which is mounted the "ball" 6, of the well known universal ball-and-socket joint commonly employed in devices of this class as referred to above.

Mounted upon the upper side of the leg 3 is an upper steel clamp jaw element 7. By means that will become clear, the jaw element 7 may be adjustably positioned in horizontal directions on the leg 3 and secured in each adjusted position, and this element and its adjustment and operative functions constitute an important feature of the invention.

A constraining and guiding steel loop 8 for the jaw element 7 is provided by means of a downwardly open U-form steel strap 9 lying on top of the jaw element 7 and at its ends overlapping the edges of the jaw element and welded as at 10 to the side edges of the jaw element 7, see Fig. 3.

The jaw element 7 has a slot 11 (Fig. 4) punched out therefrom, the side edges of the slot being toothed or serrated as at 12. A washer 13 is provided having teeth 14 on opposite side edges thereof loosely intermeshed with the serrations 12; and has a clamp bolt hole 15 therein, through which a jaw clamp bolt 16 extends.

In the assembled operative positions of the parts as illustrated, the jaw element 7, lies upon the upper leg 3; the washer 13 in the slot 11 also lies on the upper leg 3; the clamp bolt 16 extends through the hole 15 in the washer, and through a perforation 17 provided in the upper leg 3. The jaw element 7 is thus locked against shifting horizontally on the leg 3 and its locked horizontal position may be adjustably changed by small steps by lifting out the washer from the slot and sliding the jaw element 7 along on the leg 3 in its loop 8 and replacing the washer 13, meshing its teeth 14 with a different set of teeth 12.

Upon the underside of the leg 3 is welded as at 18 a pair of transversely spaced V-blocks 19—19 having mutually aligned downwardly open V-notches 60—60 therein.

The outer (left) end portion of the jaw element 7 is bent downwardly as at 20 providing a dihedral corner 21. A short length of channel section steel 22 is provided for optional use (to be described) and may be mounted in the position of Fig. 1 by a bolt 23 welded to its web and projected through a perforation 24 in the jaw element 7 to receive a clamping nut 25.

A lower steel horizontal jaw element 26 is provided having a clamp bolt perforation 27 axially aligned with the clamp bolt perforation 17; and the outer (left) end portion is bent upwardly as at 28 providing a dihedral corner 29. Inwardly of the end portion 28 is a pair of transversely spaced V-blocks 30—30 having mutually aligned upwardly open V-notches 31—31 therein, mounted on the upper side of the jaw element 26 preferably directly under the V-blocks 19—19, and for operative purposes (to be described) are removably mounted, and to this end have bolts 32—32 welded thereto and projected through perforations 33—33 in the jaw element 26 to receive mounting clamp nuts 34—34, see Fig. 5.

The horizontal jaw element 26 continues into a vertical leg 35 lying along the inside of the frame leg 2.

The main jaw clamp bolt 16 referred to and as partly described extends downwardly through the perforation 27 and has a head 36 under the jaw element 26.

A nut 37 is threaded on the upper end of the clamp bolt 16 above the jaw element 7; and the nut 37 may be turned to exert a clamping force between the nut 37 and bolt head 36.

As will presently be explained, in some applications an automobile bumper will be clamped between the V-blocks 30—30 and 19—19; and in other applications will be clamped between the V-blocks 30—30 and the jaw element 7, independently of the V-blocks 19—19; and in other applications will be clamped between the jaw elements 7 and 26 independently of the V-blocks. In either case, turning the nut 37 will exert this clamping action, drawing the jaw element 26 upwardly and the jaw element 7 or it and the frame leg 3 downwardly; and in this connection the washer 13 may be thinner than the jaw element 7, so that the clamping pressure of the nut 37 will be exerted on the jaw element 7, and transmitted to the leg 3 and not be exerted on the washer 13.

Figs. 8 to 13 illustrate a few of the many forms of bumper upon which the device may be clamped, and its corresponding modes of operation; the bumper in each instance being illustrated in cross section.

In Fig. 8 is shown at 38 a bumper such as was provided generally on cars before the advent of artistic contours, and many of which are still in use. It has upper and lower edges 39—40 approximately in vertical alignment. In this case the jaw element 7 may be disposed by horizontal adjustment as described to any convenient position, since it is not used as such. The edges 39 and 40 are placed in the V-notches of the V-blocks 19 and 30 and clamped therebetween as described.

In Fig. 9 is shown at 41 a bumper having upper and lower edges 42—43, but inclined, the upper edge 42 being rearwardly of the lower edge 43. In this case the lower edge 43 is placed in the notches of the V-blocks 30 and the upper edge 42 is placed in the dihedral corner 21; and the jaw element 7 is adjusted horizontally accordingly.

In Fig. 10 is shown at 44 a still more inclined bumper, clamped as described for Fig. 8, but after adjusting the jaw element 7 still farther to the left; and at 45 is shown a similar bumper, but given some ornamental contour by a more convex forward bulge as at 46 and a bent-over upper termination 47 the latter being lodged in the dihedral corner 21.

In Fig. 11 is shown at 48 a bumper having so much forward bulge as at 49 that if its upper edge were lodged in the dihedral angle 21 the bumper would engage and foul upon the adjacent V-blocks 19—19. To give clearance, the channel 22 is mounted as described (as an accessory) and the upper edge of the bumper is lodged in the dihedral corner at 50 provided between the web of the channel 22 and the end portion 20 of the jaw element 7.

In Fig. 12 is shown at 51 a more ornamental bumper, rearwardly inclined, and having both its upper and lower edges bent over inwardly as at 52 and 53. In this case, the upper edge is lodged in the dihedral corner 21; the lower V-blocks 30—30 are unbolted and removed, and the lower edge of the bumper is lodged in the dihedral corner 29.

In Fig. 13, a bumper 54 is shown similar to that in Fig. 12 but with more of a forward bulge and clearance with the upper V-blocks 19—19 is provided as described for Fig. 11 by the channel 22. This figure indicates that the dihedral corner 29 is provided at a minimum distance horizontally from the clamp bolt 16, to accommodate bumpers with the maximum forward bulge as at 55.

In the foregoing examples, which are illustrative of the many different forms of bumper encountered, it will be apparent that the device should take up a position on the bumper so that the ball 6 (shown in Fig. 1 but omitted from these illustrative figures for simplicity) will be vertical and function normally, and that this is done by corresponding horizontal adjustments of the jaw element 7.

In the form of the invention above described this adjustment is made by small steps made possible by the toothed washer 13 and toothed slot 11. In some cases, a simpler adjustment with larger steps may suffice, and this is shown in Figs. 6 and 7. Here the jaw element 7A is provided with a series of holes 56—56 for the bolt 16. In any instance, if these steps of adjustment are too great an intermediate step may be provided by a block 57 (as an accessory) mounted on the end portion 20, and providing a dihedral corner 58 for the described purposes, which is farther rearward by say one-half a step than the dihedral corner 21.

The block 57 may be an accessory channel piece such as was described above and shown at 22 in Figs. 1 and 11; and may be mounted by means of a perforation 59 in the end portion 20, as shown in Fig. 6. The hold 24 may also be provided, and the channel piece 57 mounted thereat and utilized if desired in the same manner as described for the channel piece 22 of Fig. 11.

In this form of Figs. 6 and 7, instead of a complete loop (such as at 8 in the first described form) the middle part of the loop strap 9 is dispensed with resulting in tongues 9A—9A overlapping the opposite sides of the jaw element 7A; the purpose and functions of these tongues being the same as those of the complete loop 8 above described.

It will be noted that the V-blocks 19 and 30 comprise in each form two parts spaced apart transversely, which gives a more rigid and stable grip on the bumper than would be had with only a single V-block or notch; although this is not an essential feature.

As mentioned, the vertical leg 35 (Fig. 1) of the lower clamp jaw element 26, simply lies or overlaps the inner side of the frame leg 2 without being secured to it. For bumpers of different vertical dimensions these parts therefore simply slide upon each other as the jaw elements are moved closer together or farther apart in adapting the device to the size of bumper.

It has been found to be unnecessary to fasten these parts 35 and 2 to each other and complication is thereby avoided. In the transverse direction as indicated in Fig. 2 the overlap of part 35 on part 2 is coextensive with part 2, and the broad area of contact between them keeps the lower jaw element 26 from rotating on the bolt 16; and this keeps the jaw element 26 always in position directly under the leg 3 and jaw element 7, making it simple and easy to apply the device to both the upper and lower edges of the bumper.

Similarly the loop 8 of Fig. 1 (or the tongues 9A of Fig. 7) embracing the upper jaw element 7 keep it from rotating around the bolt 16 for a like purpose as well as keeping it in position upon the top of the leg 3 and allowing it to slide horizontally while being adjusted.

While for convenience, the element 7 in the form of Fig. 1 and the element 7B in the form of Fig. 6 is in each case referred to above as the upper jaw element, and while these elements as described do function as the upper jaw elements when the dihedral corner 21 is used and the V-blocks 19—19 are not used, it is a fact that the leg 3 functions as the upper jaw element when the V-blocks 19—19 are used. In principle therefore the upper jaw element in these forms Fig. 1 and Fig. 6, is in two parts, the element 7 or 7A and the leg 3; and in principle this two part upper jaw element can be shortened or lengthened by the described adjustment; and the V-blocks 19—19 can be used for the shortest length of jaw element and for other lengths of jaw element the dihedral corner 21 as described can be used.

The device is claimed in some of the claims as embodying this principle.

As further emphasizing the fact that within the scope of the invention the upper jaw element as a whole can be lengthened or shortened whether the V-blocks 19—19 or the dihedral corner 21 is used, there is shown in Fig. 14 a form in which both are on the same, adjustably positionable jaw element.

In the modification of Fig. 14 the upper V-blocks, here 19A—19A are detachably mounted on the underside of the upper jaw element here 7B, by bolts 61 welded to the V-blocks and projected upwardly through holes 62 in the jaw element 7B and secured by nuts 63.

When the dihedral angle 21 is to be used to grip the top of the bumper as described above, the V-blocks 19A may be removed.

The structure otherwise may be the same as that of Fig. 1 or of Fig. 6.

The jaw element 7B, in this case a one-part jaw element, can be adjusted horizontally by the means hereinbefore described to position the V-blocks 19A—19A above the V-blocks 30—30 as illustrated in Fig. 14; or adjusted toward the left to position the dihedral corner 21, wherever wanted after removal of the V-blocks 19A—19A.

In view of the complete description of the forms of Figs. 1 and 6 and of the two types of upper jaw adjustment, it is believed that further description of the form of Fig. 14 is unnecessary.

When the device is in operation, the load of propelling forwardly a trailer vehicle, attached to the ball 6, there will be a tendency for the frame leg 2 to rock rearwardly around the pressure joint of the nut 37 as a fulcrum; but this tends to move the upper jaw into even greater gripping action with the bumper.

When the propelling automobile is slowed down or stopped suddenly, the inertia of the trailer vehicle will exert a great thrust forwardly on the ball 6 and leg 2, and tend to rock the leg 2 in the forward direction and tend to loosen the grip of the device on the bumper; but this is readily completely prevented and the preferred way to prevent it is to cause the vertical leg 35 (against which the frame leg 2 rests) to react against the bolt 16. While this could be done by having the leg 35 lie along the bolt 16 in contact with it I prefer to have it spaced therefrom as shown in the drawing and to provide a lip 64 projecting inwardly and terminating adjacent to or in contact with the side of the bolt 16.

Also to further counteract the forward inertia of the trailer as referred to, I prefer to extend the frame leg 2 downwardly, as shown, until its lower end portion as at 65 is horizontally opposite the lower jaw element 26, and will transmit force directly therethrough to the bolt 16.

I claim:

1. In a trailer hitch device for attaching to the bumper of an automobile, an inverted L-shaped main frame comprising a vertical portion and an upper forwardly and rearwardly extending horizontal portion; a universal joint ball secured to a forward part of the vertical frame portion; a horizontal upper jaw element horizontally, slidably, adjustably positionable forwardly and rearwardly upon the upper side of the horizontal frame portion; guide means on the horizontal frame portion embracing and guiding sliding movements of the upper jaw element; an upper bumper-grip on the upper jaw element; a lower L-shaped jaw element comprising a horizontal portion having a lower bumper-grip, and comprising a vertical portion extending upwardly from the horizontal portion and along the rear side of the main frame vertical portion; the horizontal portions of the lower jaw element and of the main frame being provided with axially aligned perforations, and the upper jaw element being provided with aperture means; a clamp bolt projected through the aligned perforations, and also through the aperture means in all forwardly and rearwardly adjusted positions of the upper jaw element.

2. In a trailer hitch device for attaching to the bumper of an automobile, an inverted L-shaped main frame comprising a vertical portion and an upper forwardly and rearwardly extending horizontal portion; a universal joint ball secured to a forward part of the vertical frame portion; a horizontal upper jaw element horizontally, slidably, adjustably positionable forwardly and rearwardly upon the upper side of the horizontal frame portion; guide means on the horizontal frame portion embracing and guiding sliding movements of the upper jaw element; an upper bumper-grip on the upper jaw element; a lower L-shaped jaw element comprising a horizontal portion having a lower bumper-grip, and comprising a vertical portion extending upwardly from the horizontal portion and along the rear side of the main frame vertical portion; the horizontal portions of the lower jaw element and of the main frame being provided with axially aligned perforations, and the upper jaw element being provided with aperture means; a clamp bolt projected through the aligned perforations, and also through the aperture means in all forwardly and rearwardly adjusted positions of the upper jaw element; said aperture means comprising a forwardly and rearwardly extending slot in the upper jaw element, a washer element provided with a clamp bolt receiving perforation, and movable in the slot to different positions to align its perforation with the said aligned perforations in each adjusted position of the upper jaw element, and means to fix the washer in the slot in each position thereof.

3. In a trailer hitch device for attaching to the bumper of an automobile, an inverted L-shaped main frame comprising a vertical portion and an upper forwardly and rearwardly extending horizontal portion; a universal joint ball secured to a forward part of the vertical frame portion; a horizontal upper jaw element horizontally, slidably, adjustably positionable forwardly and rearwardly upon the upper side of the horizontal frame portion; guide means on the horizontal frame portion embracing and guide sliding movements of the upper jaw element; an upper bumper-grip on the upper jaw element; a lower L-shaped jaw element comprising a horizontal portion having a lower bumper-grip, and comprising a vertical portion extending upwardly from the horizontal portion and along the rear side of the main frame vertical portion; the horizontal portions of the lower jaw element and of the main frame being provided with axially aligned perforations, and the upper jaw element being provided with aperture means; a clamp bolt projected through the aligned perforations, and also through the aperture means in all forwardly and rearwardly adjusted positions of the upper jaw element; said aperture means comprising a forwardly and rearwardly extending slot in the upper jaw element, having teeth on a side thereof, and a washer element in the slot resting on the upper side of the main frame horizontal portion and provided with a clamp bolt receiving perforation, and movable forwardly and rearwardly relative to the upper clamp element to different positions in the slot and having teeth meshed with the slot teeth in each position thereof, to align the washer perforation with said aligned perforations in each adjusted position of the upper jaw element.

4. In a trailer hitch device for attaching to the bumper of an automobile, an inverted L-shaped main frame comprising a vertical portion and an upper forwardly and rearwardly extending horizontal portion; a universal joint ball secured to a forward part of the vertical frame portion; a horizontal upper jaw element horizontally, slidably, adjustably positionable forwardly and rearwardly upon the upper side of the horizontal frame portion; guide means on the horizontal frame portion embracing and guiding sliding movements of the upper jaw element; an upper bumper-grip on the upper jaw element; a lower L-shaped jaw element comprising a horizontal portion having a lower bumper-grip, and comprising a vertical portion extending upwardly from the horizontal portion and along the rear side of the main frame vertical portion; the horizontal portions of the lower jaw element and of the main frame being provided with axially aligned perforations, and the upper jaw element being provided with aperture means; a clamp bolt projected through the aligned perforations, and also through the aperture means in all forwardly and rearwardly adjusted positions of the upper jaw element; said aperture means comprising a forwardly and rearwardly extending series of perforations in the upper jaw element alignable respectively with the said aligned perforations upon adjustably positioning the upper jaw element.

ARNOLD P. ROTH.

REFERENCES CITED

The following references are of record in the file of this patent:

UNITED STATES PATENTS

| Number | Name | Date |
| --- | --- | --- |
| 2,092,593 | Seys | Sept. 7, 1937 |
| 2,142,365 | McKee | Jan. 3, 1939 |
| 2,306,007 | Thorp | Dec. 22, 1942 |